Patented Dec. 23, 1941

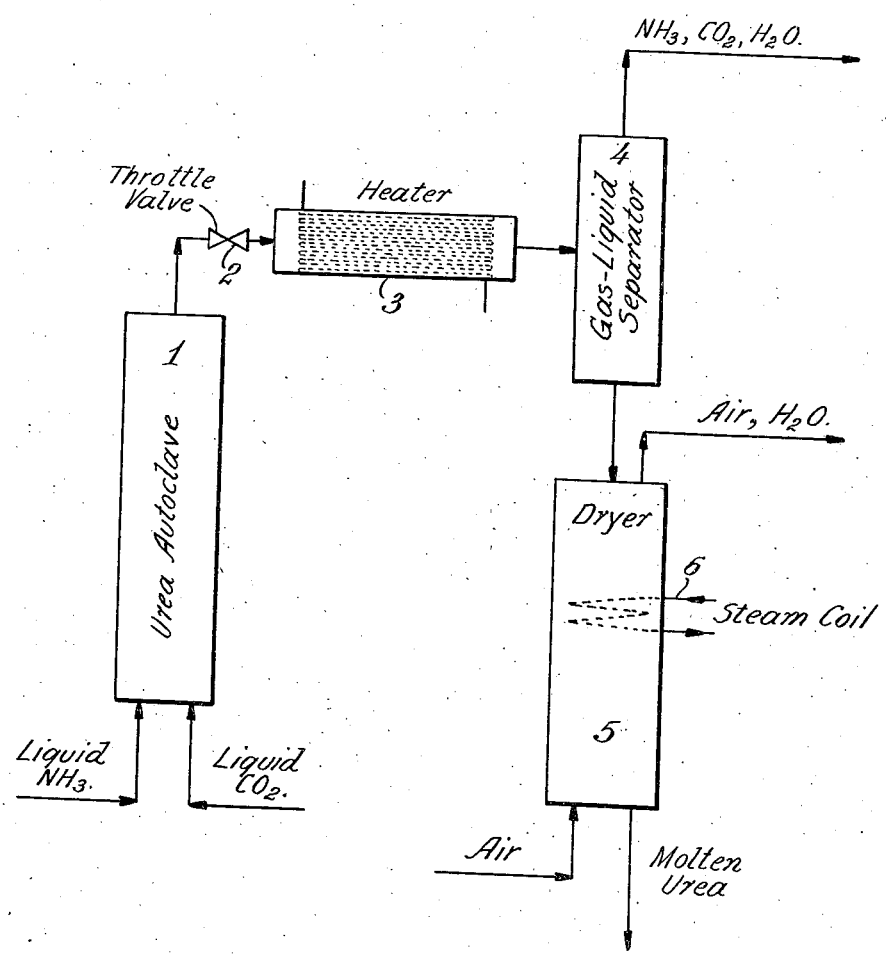

2,267,133

UNITED STATES PATENT OFFICE 2,267,133

PROCESS FOR TREATING UREA SYNTHESIS EFFLUENTS

Frank Porter, Syracuse, N. Y., assignor to The Solvay Process Company, New York, N. Y., a corporation of New York Application February 20, 1939, Serial No. 257,296

8 Claims. (Cl. 260—555)

This invention relates to a process for removing water and uncombined ammonia and carbon dioxide from the product containing urea obtained in the synthesis of urea from ammonia and carbon dioxide under high pressures and temperatures.

It is well known that by heating ammonia and carbon dioxide in an autoclave under high pressures urea may be synthesized. The synthesis reaction is incomplete and the product withdrawn from the autoclave is a liquid or semi-liquid mass containing, in addition to urea, ammonia and carbon dioxide (either free or as readily dissociated compounds) and water. This product formed in the urea autoclave and withdrawn therefrom is known as autoclave effluent.

It is known to treat this effluent by a number of different procedures to recover from it the ammonia and carbon dioxide which have not been converted to urea and to vaporize the water so as to obtain finally a relatively pure solid urea. To do this it has been proposed to release the pressure on the autoclave effluent in discharging it into an externally heated vessel in which the ammonia, carbon dioxide and water are vaporized and drawn off leaving solid urea. A disadvantage in this procedure is that it does not permit of transferring heat to the autoclave effluent at high rates and, with the rapid cooling of the effluent which occurs upon release of pressure, solid ammonia-carbon dioxide salts and/or urea crystallize in the effluent and increase the difficulties of effectively supplying the heat required for vaporizing the ammonia, carbon dioxide and water from the effluent. The crystallization of solids may be avoided by keeping in the vessel a large body of effluent which is low in ammonia and carbon dioxide. This introduces another difficulty: by retaining the effluent at high temperatures for a prolonged period of time urea is decomposed.

It has also been proposed to release the pressure on the urea autoclave effluent and pass it through a tower in which it is heated by indirect heat transfer with the evolved gases passing countercurrent to the liquid effluent. In many cases it was found that in carrying out such a procedure the crystallization of solid from the effluent resulted in a plugging up of the tower. Heating the effluent by direct contact with steam or hot air necessitated passing through the vaporizer large amounts of these heating gases because of poor heat transfer to the semi-solid mass which would form upon release of the pressure.

It is an object of this invention to provide a process for distilling ammonia, carbon dioxide and water from the effluent of a urea synthesis autoclave whereby the heat required for vaporizing these constituents of the effluent may be efficiently transferred to the effluent from a heating medium passed in indirect heat exchange therewith while at the same time preventing the accumulation of solids in the effluent to such an extent as to interfere with the efficient, rapid transfer of heat to the effluent.

I have discovered that by passing the urea autoclave effluent at a high mass velocity through an externally heated tube ammonia, carbon dioxide and water may be vaporized from the effluent without the accumulation in the effluent of sufficient solid material crystallized from the solution to interfere materially with the rate of heat transfer to the effluent from the heating medium. As the ammonia, carbon dioxide and water vapor are evolved from the effluent being heated in the tube, they travel cocurrently with the liquid passing through the tube. The evolution of these vapors acts to promote a rapid flow of material through the tube. Heat is supplied to the vaporizer tube at a rate sufficient to vaporize the major portion, and preferably substantially all, of the ammonia and carbon dioxide from the effluent during its passage through the vaporizing tube at high mass velocity. The process of this invention is distinguished from the prior art processes referred to above in heating the effluent while it is flowing through a tube at a mass velocity of at least 1 pound of material per second per square foot cross-sectional area of free space in the tube. For heating the effluent in accordance with the process of this invention, tubes of limited cross-sectional area are used, preferably tubes in which the cross-sectional area of the free space is 3 square inches or less (equivalent to a circular tube of 2 inches or less internal diameter), through which the material being heated flows past any given point in the tube as a relatively uniform mixture of liquid with gas and solid (if the latter be present) which are formed by heating the liquid.

After vaporizing ammonia, carbon dioxide and water from the effluent while it is passing through the externally heated tube, the mixture of liquid and gas leaving the tube is treated to separate the gas from the liquid. The liquid thus recovered is substantially free from ammonia and carbon dioxide and also has distilled from it at least a portion of the water initially contained in the autoclave effluent.

By thus substantially freeing the effluent of its ammonia and carbon dioxide contents I have found that the liquid containing the urea and water which has not been distilled off with the ammonia and carbon dioxide may then be treated to vaporize the remaining water in a peculiarly efficient procedure without difficulties arising from the formation of solids as the liquid is further distilled to recover a urea melt which, by cooling, may be solidified to obtain a final solid urea product. In obtaining a substantially anhydrous urea melt in accordance with this invention, the liquid containing urea and water separated from the ammonia, carbon dioxide and water distilled from the autoclave effluent is passed through a packed tower countercurrent to air. Heat is supplied to vaporize the water from the liquid either by introducing into contact with the liquid hot air or by indirectly heating the liquid which is contacted with the air. If desired, both of these methods for supplying the heat to vaporize the water may be employed. The packed tower used in thus evaporating the residual water from the liquid containing the urea is the usual type of packed tower well known to the art for bringing a gas and liquid into intimate contact. Such towers contain small pieces of solid material over which the liquid entering the tower is dispersed. The liquid trickles downwardly through the body of packing in attenuated streams flowing in direct contact with gas admitted to the bottom of the tower and passed upwardly therethrough. The use of a packed tower permits of exposing a large surface of the liquid to contact with the air and results in rapid distillation of water from the liquid.

The combination of the two steps described above in which the ammonia and carbon dioxide and a part of the water contained in the autoclave effluent are first distilled by supplying the requisite heat to the effluent while it is passing at a high mass velocity through an externally heated tube followed by separation of the vaporized ammonia and carbon dioxide from the liquid containing urea and water and then the water in this liquid is distilled with air at an elevated temperature in a packed tower through which the liquid and air flow in direct, countercurrent contact, permits of rapidly supplying the heat required to vaporize the ammonia, carbon dioxide and water from the urea synthesis effluent so that it is unnecessary to maintain this effluent at high temperatures for prolonged periods of time. This is an advantage of great importance, since a prolonged heating of a urea synthesis effluent to vaporize therefrom ammonia, carbon dioxide and water results in the decomposition of urea and formation of undesired products such as biuret.

The invention will be more particularly described and illustrated by the following example. The process of this example is diagrammatically shown in the accompanying drawing.

With reference to the drawing, the numeral 1 indicates a urea autoclave in which ammonia and carbon dioxide are treated at urea synthesis temperatures and pressures in any of the manners well known to the art. For example, liquid ammonia and liquid carbon dioxide are continuously pumped into the autoclave in the proportions of 3 mols of ammonia for every 1 mol of carbon dioxide and are heated at a temperature of 190° C. under a pressure of about 300 atmospheres. The autoclave effluent, which will consist of a liquid mass containing urea, water, carbon dioxide and ammonia, is passed through a throttle valve 2 and heater 3 into a gas-liquid separator 4 in which a pressure of about atmospheric is maintained. Heater 3 is a tubular heater in which the autoclave effluent flows through externally heated tubes of small cross-section, for example tubes of 1 inch internal diameter. The heat is supplied by a heating medium such as superheated steam, which is introduced into the heating chamber surrounding the tubes of heater 3.

In passing through heater 3 into separator 4 the pressure on the effluent is decreased sufficient to cause effluent to flow through the heater tubes at the rate of one or more pounds of effluent per second per square foot of cross-sectional area of free space in the heater tube. Heat is supplied to the effluent while passing through heater 3 at a rate sufficient to vaporize substantially all the ammonia and carbon dioxide and the major portion of the water contained in the effluent entering the heater. The vaporized gases flow concurrently through the heater with the effluent. From the heater the liquid and vaporized gas flow into separator 4 from which the gas is drawn off separately from the liquid. This gas may be treated, if desired, to recover the ammonia and carbon dioxide for return to the urea synthesis autoclave for production of additional urea therefrom. The liquid is drawn from the bottom of the separator. A temperature of about 140° C. is maintained in separator 4 to prevent the solidification of urea from the liquid therein.

There will be a progressive drop in pressure on the autoclave effluent as it passes through heater 3 which causes the liquid to flow through the heated tube or tubes at the high mass velocity hereinbefore defined. As the pressure on the effluent is lowered the ammonia and carbon dioxide it contains vaporize. The drop in pressure and vaporization of ammonia and carbon dioxide take place through a long section of the heater tube. This spreading of the evolution of gas from the effluent extends the tube area through which the heat may be supplied which is required for maintaining the effluent at the dissociation temperature of the compounds of ammonia and carbon dioxide it contains. This, coupled with the highly efficient heat transfer to the rapidly flowing stream of liquid in the tubes, prevents the crystallization from the effluent of sufficient solid material to interfere in any substantial degree with the flow of the effluent through the heater and rapid transfer of the heat to it. 10% to 15% (by weight) of solid may crystallize in the liquid without causing any difficulty in heating the effluent to vaporize the ammonia and carbon dioxide. When solid is crystallized from the solution in the heater it will usually redissolve as the effluent is further heated and ammonia and carbon dioxide vaporized.

The liquid drawn from separator 4 containing urea and water but substantially free from ammonia and carbon dioxide, is introduced into the top of a drier 5. Drier 5 is provided with packing rings or other packing material over which the liquid flows downwardly in countercurrent contact with air while the liquid is maintained at temperatures high enough to vaporize the water, preferably at a temperature between about 132° C. and 150° C. A steam coil 6 is provided in a mid-portion of drier 5 to supply heat to the liquid and air passing through the tower and the air entering the bottom of the tower is preferably preheated to a temperature of 160° C. Substantially all of the water in the liquid introduced to drier 5 is vaporized and passes out of the top of the tower together with the air. Substantially anhydrous molten urea flows from the bottom of the tower and may be solidified in any desired manner.

The above example may be modified in numerous ways without departing from the scope of the invention. The invention is not limited to any particular method or conditions for synthesizing the urea from the ammonia and carbon dioxide. The total heater tube cross-sectional area may be made small with respect to the amount of effluent to be passed therethrough so that substantially the entire drop in pressure from that of the urea autoclave to that of the gas-liquid separator may occur as the effluent flows through the heated tubes at a high mass velocity. The rate of flow through the tubes may be controlled by a throttle valve positioned in the pipe leading to the heater or in the pipe through which the treated effluent flows from the heater to separator 4. In passing through the externally heated tubes in which the ammonia and carbon dioxide and a part of the water are vaporized from the autoclave effluent, the pressure may be substantially above atmospheric even at the point where the treated effluent leaves the heated tubes. However, with the effluent leaving the heater while still under pressures above atmospheric, the temperature to which the effluent is heated in order to vaporize from it ammonia and carbon dioxide must be correspondingly increased. The higher the temperature the more important it is that the effluent from which ammonia and carbon dioxide are evolved be maintained at the high temperatures only a very short time, since with increasing temperatures the rate of decomposition of urea increases. For example, the effluent should be kept at a temperature of 140° C. for less than 4 minutes if decomposition of more than 1% of the urea is to be avoided. It should be kept at a temperature of 160° C. for less than 1 minute if more than 1% of decomposition of the urea is to be avoided. If desired, air may be passed through the heater with the urea synthesis effluent to lower the partial pressure of water, carbon dioxide and ammonia in the gas phase of the material flowing through the heater and thus facilitate the evolution of these constituents from the effluent.

If urea containing some water is to be produced as a product of this process, the drying of the urea-water mixture drawn from separator 4 in drier 5 may be omitted. By supplying to heater 3 sufficient heat to vaporize the major portion of the water in the effluent together with the ammonia and carbon dioxide, the liquid drawn from separator 4 may be solidified by cooling and, if desired, its water content then removed by drying the solid. Further, although the treatment of a urea autoclave effluent by the three steps of evolving the ammonia, carbon dioxide and a major proportion of the water in heater 3, separation of the liquid from the evolved gases, and then vaporizing the residual water from the liquid in drier 5 by countercurrent direct contact with air are peculiarly suitable for the treatment of autoclave effluent from urea synthesis since a urea melt may thereby be obtained in substantially anhydrous form without prolonging the heating of the effluent so as to cause undue decomposition of the urea and with efficient transfer of heat to the effluent to vaporize the ammonia, carbon dioxide and water, the method of drying a urea-water mixture of my invention may be advantageously employed apart from the other steps of this invention. Thus, the ammonia and carbon dioxide may be vaporized from a urea synthesis autoclave effluent by methods heretofore known to the art to produce a urea-water mixture containing about 10% or less water by weight. To recover substantially anhydrous urea from such a mixture, it may be advantageously treated with air in a packed column or tower through which the air and urea-water mixture are passed countercurrently, while supplying the heat required to maintain the mixture liquid and to vaporize the water from it. Instead of air, any gas inert towards urea which at the temperature maintained in contacting the gas with the urea-water mixture has a lower partial pressure of water vapor than the liquid, may be used in this step of the process.

I claim:

1. The process for the treatment of a urea synthesis autoclave effluent obtained under high pressure and temperature from a urea autoclave which comprises flowing said effluent through an externally heated tube of restricted cross-sectional area at a high mass velocity such that one pound or more of said effluent passes through said tube per square foot of cross-sectional area of free space of the tube per second, supplying to said effluent by indirect heat exchange through the wall of said tube sufficient heat to vaporize carbon dioxide and ammonia therefrom while the effluent is passing through said tube and thereafter separating the thus vaporized ammonia and carbon dioxide from the unvaporized liquid.

2. The process for the treatment of a urea synthesis autoclave effluent obtained under high pressure and temperature from a urea autoclave which comprises flowing said effluent through an externally heated tube of restricted cross-sectional area at a high mass velocity such that one pound or more of said effluent passes through said tube per square foot of cross-sectional area of free space of the tube per second and there is a progressive decrease in pressure on said effluent while passing through the tube, supplying to said effluent by indirect heat exchange through the wall of said tube sufficient heat to vaporize a major proportion of the carbon dioxide and ammonia therefrom while the effluent is passing through said tube and thereafter separating the thus vaporized ammonia and carbon dioxide from the unvaporized liquid.

3. The process for the treatment of a urea synthesis autoclave effluent obtained under high pressure and temperature from a urea autoclave which comprises flowing said effluent through an externally heated tube having a cross-sectional area of free space of 3 square inches or less at a high mass velocity such that one pound or more of said effluent passes through said tube per square foot of cross-sectional area of free space of the tube per second and there is a progressive decrease in pressure on said effluent while passing through the tube, supplying to said effluent by indirect heat exchange through the wall of said tube sufficient heat to vaporize substantially all the carbon dioxide and ammonia and a major portion of the water contained in said effluent while it is passing through said tube, and thereafter separating the thus vaporized ammonia, carbon dioxide and water from the unvaporized liquid.

4. The process for the treatment of a urea synthesis autoclave effluent obtained under high pressure and temperature from a urea autoclave which comprises venting said effluent to substantially atmospheric pressure through an externally heated tube having an internal diameter of about 1 inch through which the effluent flows at a high mass velocity such that one pound or more of said effluent passes through said tube per square foot of cross-sectional area of free space of the tube per second, supplying to the said effluent by indirect heat exchange through the wall of said tube sufficient heat to vaporize substantially all the carbon dioxide and ammonia and a portion of the water contained therein without deposition from the effluent while it is passing through said tube of sufficient solid to substantially affect the rate of heat transfer to the material flowing through the tube, and thereafter separating the thus vaporized ammonia, carbon dioxide and water from the unvaporized liquid.

5. The process for the treatment of a urea synthesis autoclave effluent obtained under high pressure and temperature from a urea autoclave which comprises flowing said effluent through an externally heated tube of restricted cross-sectional area at a high mass velocity such that one pound or more of said effluent passes through said tube per square foot of cross-sectional area of free space of the tube per second and there is a progressive decrease in pressure on said effluent while passing through the tube, supplying heat to said effluent by indirect heat exchange through the wall of said tube and thereby vaporizing substantially all the carbon dioxide and ammonia and a major portion of the water contained in the effluent while the effluent is passing through said tube, separating the thus vaporized ammonia, carbon dioxide and water from the unvaporized liquid, thereafter flowing said liquid downwardly through a mass of small pieces of solid material over which said liquid flows in attenuated streams while passing in countercurrent flow with said liquid an inert gas and maintaining said liquid at a temperature at which the water contained therein is vaporized into said gas and a substantially anhydrous molten urea is formed.

6. The process for the treatment of a urea synthesis autoclave effluent obtained under high pressure and temperature from a urea autoclave which comprises stripping from said effluent substantially all the carbon dioxide and ammonia and a major proportion of the water contained therein to form a liquid containing urea and water thereafter, flowing said liquid downwardly through a mass of small pieces of solid material over which said liquid flows in attenuated streams while passing in countercurrent flow therewith an inert gas and maintaining said liquid at a temperature at which the water contained therein is vaporized into said gas and a substantially anhydrous molten urea is formed.

7. The process for the treatment of the effluent from a urea synthesis autoclave which comprises removing substantially all of the ammonia and carbon dioxide content and a major portion of the water content of said effluent to leave a liquid containing urea and no more than about 10% water, thereafter flowing said liquid downwardly through a body of small pieces of solid material over which said liquid flows in attenuated streams while passing in countercurrent flow therewith an inert gas having a lower partial pressure of water vapor than said liquid and maintaining said liquid at a temperature at which the water contained therein is vaporized into said gas and a substantially anhydrous molten urea is formed.

8. The process for the vaporization of water from an urea-water mixture which comprises flowing a liquid which initially contains urea and no more than about 10% water and is substantially free from ammonia and carbon dioxide, through a body of small pieces of solid material over which said liquid flows in attenuated streams while passing in countercurrent flow with said liquid an inert gas and maintaining said liquid at a temperature at which the water contained therein is vaporized into said gas and a substantially anhydrous molten urea is formed.

FRANK PORTER.